United States Patent Office 3,146,113
Patented Aug. 25, 1964

3,146,113
MOULD PAINT
James M. Middleton and Paul G. McIlroy, Sheffield, England, assignors to The British Steel Castings Research Association, Sheffield, England
No Drawing. Filed Sept. 14, 1960, Ser. No. 55,858
Claims priority, application Great Britain Sept. 18, 1959
7 Claims. (Cl. 106—38.23)

This invention relates to paints (also known as "mould washes") for application to the metal-contacting surfaces of sand moulds and cores to provide resistance to metal penetration in an attempt to produce clean smooth castings free from surface blemishes.

Such paints usually consist of a suspension of refractory powder in water to which is added a bonding agent to provide good adhesion within the paint film and a suspending agent to retard sedimentation of the refractory particles.

The chemical composition of the refractory powder employed as the base of the paint depends on the metal to be cast and also on the chemical composition of the moulding sand, i.e., to be fully effective the refractory should not melt, react with the molten metal, or combine with the moulding sand at the metal pouring temperatures. Hence depending on the prevailing conditions at the mould surface, the refractory may either be zirconium silicate (zircon), silica, magnesia, magnesite, chromite, alumina, titania, olivine, graphite, or a fused china clay (molochite). For example, with steel castings it is preferable to use either zircon, silica, magnesia, or alumina when the moulding material is predominantly silica sand; but olivine may be used on olivine moulding sand mixes.

The percentage by weight of refractory depends largely upon the method of application to be employed; thus, in paints as at present prepared, this may be as low as 40% for spraying, approximately 50% to 60% for dipping, and approximately 60% to 70% for brushing, the water content diminishing in accordance with increasing refractory content. Natural drying oils (e.g., linseed oil) and other organic materials such as sulphite lye, molasses, or a cereal (e.g., dextrin) have proved satisfactory as the bonding agent when used in the proportion of 1% to 3% by weight, and swelling clays, such as a swelling bentonite clay, have hitherto been used in similar proportions as the suspending agent.

However, clay as a suspending agent is disadvantageous in that when used in proportions high enough to give good suspending properties it invariably causes the applied film of paint to shrink severely upon air or oven drying and even to crack and peel away from the sand surface. Furthermore, even in the event of a dried film being obtained free from cracks, cracking still occurs to an appreciable extent when, on pouring the molten metal, the film is suddenly subjected to temperature of the order of 1300° C., thus allowing penetration of molten metal into the sand before superficial solidification of the casting takes place, penetration being particularly extensive under conditions of high ferrostatic pressure. This is particularly the case if a thick film is applied. Moreover, high proportions of clay produce a very high consistency paint which may prove unsuitable for brush or spray application.

The object of the present invention is to provide a paint that has high long-lasting suspension properties, and is highly suitable for brush or spray application. A further object is to provide a paint that may be applied in thick films, i.e., 0.02" and upwards with negligible cracking during drying or when suddenly subjected to high temperatures, even if applied as a single coating.

According to the present invention, a paint for application to foundry sand moulds and cores comprises a suspension of a refractory powder using algin or an alginate as a suspending agent, together with an organic bonding agent.

Whereas in previous mould paints intended to be applied by spraying, the content of refractory powder could be as low as low 40%, in a paint intended for similar application but containing algin or an alginate as suspending agent according to the invention a minimum content of 55% is desirable to avoid any tendency to run down vertical surfaces of the mould or core of a thick film of the paint applied as a single coating by spraying, or by dipping. The use of a generally higher proportion of refractory powder than customary does not detract from the ability of the paint to be applied by spraying or dipping, in fact, by virtue of the presence of the algin or an alginate a composition intended primarily for brush application may also be applied by dipping. For example, cores may be coated by dipping in the same paint composition as is used for coating moulds by brushing, with a content of refractory powder up to 70%.

The refractory powder may be used in aqueous suspension, provided an alginate used as suspending agent is water-soluble, e.g., sodium alginate. Thus, with refractory powder in the range 55% to 70%, bonding agent in the range 1% to 3%, and the balance water and suspending agent, high viscosity grade sodium alginate (approximate molecular weight 173,000) may be used up to a maximum of 0.2%, but as little as 0.05% may be used. However, although it is preferred to use the high viscosity grade sodium alignate, the low viscosity grade may be used, say up to a maximum of 1.2%, but preferably in the range 0.2% to 0.8%.

The ability of a paint in accordance with the invention to form a film that is highly resistant to cracking, even when suddenly subject to high temperatures, is attributed to the physical and chemical stability of the paint both at room and elevated temperatures. However, the stability of the paint film may be impaired after pouring of the metal and before superficial solidification takes place, because the organic bonding agent is liable to be burned out by the heat of the molten metal. According to another feature of the invention, it has been found that the inclusion of a small proportion of clay in the suspension will ensure the continued stability of the paint film, at least until superficial solidification of the casting has taken place, and that even swelling clays, in proportions not exceeding the previous 1% minimum requirement as suspending agent, may be included as an extender to the bonding agent without any detrimental effect. Because of their weaker bonding action, non-swelling clays are required in somewhat greater proportions than the swelling clays, but should not exceed 3% of the total composition; for example, 2% of ball clay is substantially equivalent to 1% of swelling bentonite clay.

If, as is generally convenient, a water-soluble suspending agent is employed as an aqueous solution, the water content of that solution must be taken into account in arriving at the total water content of the final paint composition. Thus, if sodium alginate is the suspending agent employed, the aim must be to achieve the same viscosity of the final composition whatever the grade of sodium alginate. However, in general, it is most convenient to pre-mix the bonding agent and a strong solution of sodium alginate to form a concentrate, which may be stored and transported in sealed containers, together with a small proportion of clay, if required as an extender to the bonding agent, being ready thereafter for mixing with the refractory powder and sufficient water to make up the balance in the final composition. Alternatively, the refractory powder, bonding agent, and sodium alginate may be pre-mixed with a proportion of water, together with clay, if required, to form a paste, which again may be stored and transported in sealed containers, ready for mixing with sufficient water to make up the balance in the final composition.

The compositions of Examples 1 to 5, using high grade sodium alginate, have been found to be very satisfactory:

Example 1

For brush application:

|  | Percent |
| --- | --- |
| Zircon flour | 65 to 70 |
| Dextrin as bonding agent | 1.5 |
| Sodium alginate | 0.1 to 0.075 |
| Water | Balance |

This composition has been applied in single films ranging in thickness from 0.02 to 0.03 inch to numerous test cores of sand consisting of 90.75% Chelford sand, 5.0% Wyoming bentonite, 3.5% moisture, and 0.75% dextrin and subjected to pouring temperatures in the region of 1600° C. and a pressure of 25 lbs. per sq. inch (equivalent to an 8 ft. head of metal) applied one minute after pouring, without such penetration of the molten metal into the sand as would indicate appreciable cracking of the paint film.

Furthermore, moulds and cores of sand consisting of 91.0% Leighton Buzzard No. 9 sand, 5.0% Wyoming bentonite, 3.5% moisture, and 0.5% dextrin coated with paint of the same composition have proved highly resistant to metal penetration under similar conditions.

Example 2

For application by dipping:

|  | Percent |
| --- | --- |
| Zircon flour | 55 to 70 |
| Dextrin as bonding agent | 1.25 |
| Sodium alginate | 0.15 to 0.75 |
| Water | Balance |

Example 3

For spraying:

|  | Percent |
| --- | --- |
| Zircon flour | 55 to 65 |
| Dextrin as bonding agent | 1 |
| Sodium alginate | 0.15 to 0.1 |
| Water | Balance |

These two compositions are intended as equivalents of the first composition and, when applied as films of the same thickness, i.e., 0.02″ to 0.03″, by a single dipping or by spraying and drying of multiple coats to give the required thickness, have proved to be equally resistant to cracking, even when subjected to similar temperatures.

It will be noted that, for the reasons given above, the composition for brush application is also available for application by dipping. Similarly, the composition for spraying is also available for application by dipping when a generally thinner film is to be formed, using an appropriately lower proportion of refractory powder.

Example 4

For brush application:

|  | Percent |
| --- | --- |
| Zircon flour | 57.0 |
| Dextrin } as bonding agent | 1.7 |
| Linseed oil | 0.75 |
| Swelling bentonite clay as extender to the bonding agent | 0.75 |
| Sodium alginate | 0.15 |
| Water | 39.65 |

Example 5

For convenience of storage and transport, the dextrin, linseed oil, and sodium alginate of Example 4 may be pre-mixed to form a concentrate comprising:

|  | Percent |
| --- | --- |
| Dextrin | 14.82 |
| Linseed oil | 6.6 |
| Sodium alginate | 1.3 |
| Bentonite | 6.6 |
| and Water | 70.68 | all by weight of the final concentrate, 15.2 parts of this concentrate are mixed with 79.8 parts of zircon flour, and 5 parts of water to make up a paste that is used in the amount 30 to 35 lbs. per gallon of water to form the paint.

Example 6

Again, the first five ingredients may be pre-mixed with water to form a paste comprising:

|  | Percent |
| --- | --- |
| Zircon flour | 74.5 |
| Dextrin | 2.25 |
| Linseed oil | 1.0 |
| Swelling bentonite clay | 1.0 |
| Sodium alginate | 0.2 |
| and Water | 21.05 | all by weight of the final paste, 30 to 35 lbs. of which are used per gallon of water to form the paint.

A preservative or anti-bacteria agent is preferably included in the paint, the concentrate, or the paste.

What we claim is:

1. A paint for application to foundry sand moulds and cores, comprising about 55% to 70% zircon flour, about 1.25% dextrin, about 0.15% to 0.75% high viscosity grade sodium alignate, and the balance primarily water.

2. A paint for application to foundry sand moulds and cores, comprising about 57% zircon flour, about 1.7% dextrin, about 0.75% linseed oil, about 0.75% swelling bentonite, about 0.15% high viscosity grade sodium alginate, and the balance water.

3. A concentrate for use in the preparation of a paint for application to foundry sand moulds and cores, comprising about 14.82% dextrin, about 6.6% linseed oil, about 1.3% high viscosity grade sodium alginate, about 6.6% bentonite, and the balance water.

4. A paste for use in the preparation of a paint for application to foundry sand moulds and cores, comprising about 74.5% zircon flour, about 2.25% dextrin, about 1% linseed oil, about 1% swelling bentonite, about 0.2% high viscosity grade sodium alginate, and the balance water.

5. A paint for application to foundry sand molds and cores consisting essentially of a suspension of about 55 to 70% refractory powder selected from the class consisting of zircon, silica, magnesia, magnesite, chromite, alumina, titania, olivine, graphite and molochite, about 1 to 3% of an organic bonding agent selected from the class consisting of natural drying oils, sulphite lye, molasses and dextrin, about 0.05 to 0.2% high viscosity grade sodium alginate, and the balance primarily water.

6. A paint as in claim 5 which further contains up to 1% of a swelling bentonite clay as an extender to the bonding agent.

7. A paint as in claim 5 which further contains up to 3% of a non-swelling ball clay as an extender to the bonding agent.

References Cited in the file of this patent
UNITED STATES PATENTS

| | | |
|---|---|---|
| 1,856,526 | Winchester | May 3, 1932 |
| 1,868,646 | Wallace | July 26, 1932 |
| 2,287,153 | Wallace | June 23, 1942 |
| 2,544,598 | Kalina | Mar. 6, 1951 |
| 2,639,268 | Heiss | May 19, 1953 |

OTHER REFERENCES

Condensed Chemical Dictionary, published 1950 by Reinhold, N.Y.C. (pages 23 and 24).